Figure 1:
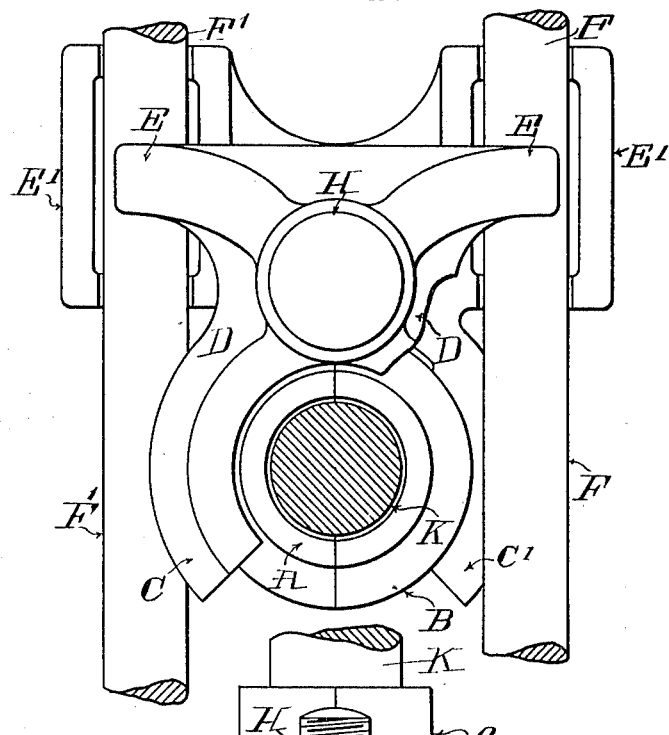

T. A. B. CARVER.
APPLIANCE FOR SUPPORTING DEVICES.
APPLICATION FILED JAN. 8, 1909.

1,001,351.

Patented Aug. 22, 1911.

2 SHEETS—SHEET 1.

Witnesses
Inventor
Thomas A. B. Carver.
by Harold Serrell
his atty.

T. A. B. CARVER.
APPLIANCE FOR SUPPORTING DEVICES.
APPLICATION FILED JAN. 8, 1909.

1,001,351.

Patented Aug. 22, 1911.
2 SHEETS—SHEET 2.

Witnesses
Inventor
Thomas A. B. Carver
by Harold Serrell
his atty

UNITED STATES PATENT OFFICE.

THOMAS A. B. CARVER, OF GLASGOW, SCOTLAND, ASSIGNOR TO TEXTILE APPLIANCES LIMITED, OF GLASGOW, SCOTLAND.

APPLIANCE FOR SUPPORTING DEVICES.

1,001,351.   Specification of Letters Patent.   Patented Aug. 22, 1911.

Application filed January 8, 1909. Serial No. 471,223.

*To all whom it may concern:*

Be it known that I, THOMAS ALBERT BRIGGS CARVER, a subject of the King of Great Britain and Ireland, and of 9 Springfield road, Dalmarnock, Glasgow, Scotland, have invented certain new and useful Improvements in or Connected with Appliances for Supporting Devices Particularly Adapted for Use in Connection with Bearings, (for which I have made application for a patent in Great Britain, No. 20,309, dated September 28, 1908, and No. 25,352, dated November 25, 1908,) of which the following is a specification.

This invention refers to improvements in or connected with appliances for supporting bearings, which although adapted to support a single bearing, are more especially devised for use under conditions where two or more bearings are required to be supported in alinement with one another, such as is required for carrying a line of shafting, provision being made by this invention whereby each bearing may be easily adjusted into the position it is required to assume, and, when set, fixed to the supporting appliance without deranging the setting of the bearings, the method of fixing in no way tending to throw the bearings out of alinement.

The object of this invention is to produce an improved form of appliance for supporting bearings comprising two clamps adapted to be drawn together by a single bolt, in the action of which a collar formed on the bearing and also a carrier, by which the bearing is to be carried, are gripped simultaneously between the two clamps, the construction permitting the force exerted by the clamps in gripping the collar and in gripping the carrier to be equal or apportioned to vary as required, and further, to provide for use in conjunction with the appliance, a carrier which may be made capable of transverse adjustment relatively to the axis of the bearing and along which the appliance may be set.

According to this invention, the appliance comprises two clamps having arms with jaws extending therefrom, the jaws being provided for embracing two seatings formed on the boss of the bearing and the two arms for embracing the carrier, provision being made for simultaneously drawing the two clamps together whereby in a single tightening action their arms are caused to tightly grip the carrier and the jaws to tightly embrace the seatings of the bearing.

In the accompanying drawings an example of the construction of an appliance and its application according to this invention is illustrated, in which:—

Figure 2:
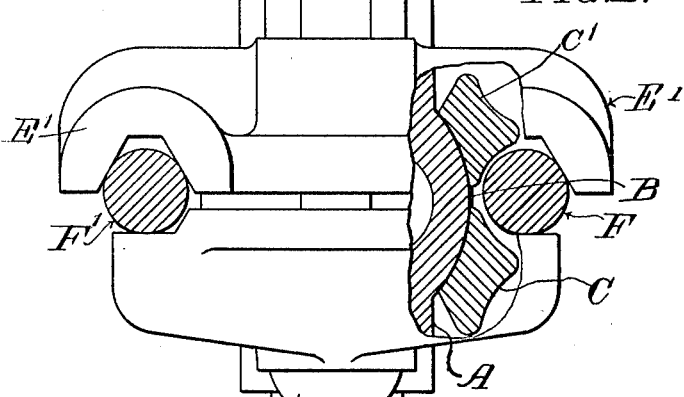
Figure 3:
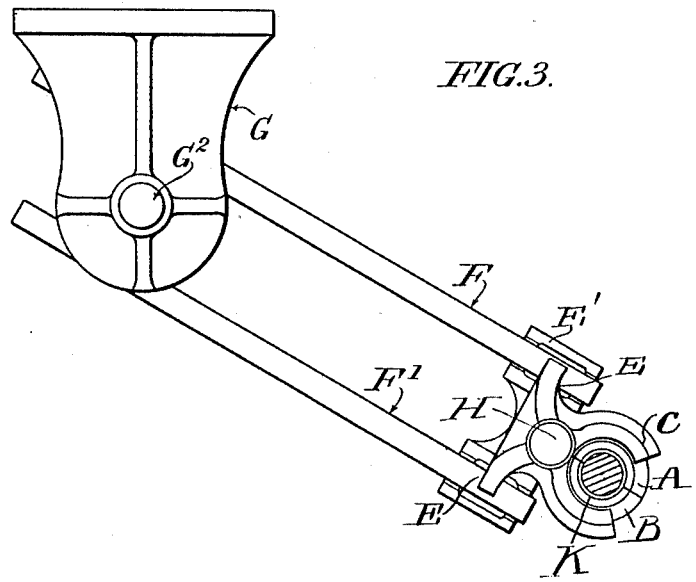

Figure 1 is a sectional elevation and Fig. 2 is a sectional plan illustrating an appliance constructed according to this invention. Fig. 3 is a side elevation and Fig. 4 as a sectional plan showing the appliance mounted upon a carrier.

In the form of construction illustrated a cylindrical bearing A is provided having a spherically shaped collar B formed thereon, comprising two complementary side seatings concentric with the axis of the bearing, which is embraced between two jaws C $C^1$, each comprised in the construction of a member having a neck D which connects each jaw with an arm E or $E^1$, the pair of arms being adapted to grip a carrier as will be hereinafter described. In the form of construction illustrated the bearing surfaces of the jaws C $C^1$ are concave to conform to the seatings of the collar B; but in other forms of construction the bearing surfaces of the jaws may be spherically concave and the seatings on the collar B may be suitably formed to bear therein.

Figure 4:
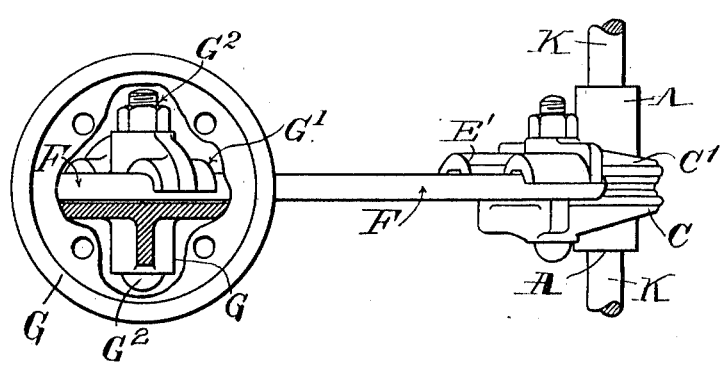

In the form of construction shown, and as may best be seen at Figs. 3 and 4, the carrier comprises two rods, F, $F^1$ extending from a support G, arranged parallel to one another and at a distance apart to permit the bearing A to be introduced between them, a rod passing on each side of the bearing. The pair of rods F, $F^1$ may be made capable of transverse adjustment relatively to the axis of the bearing. In the construction illustrated the required transverse adjustment of the rods F, $F^1$ is attained by fixing them to the support G by means of a yoke $G^1$ and bolt $G^2$, about the axis of which they are capable of angular adjustment before the bolt $G^2$ is tightened to fix them. As shown, the jaws C $C^1$ embrace their respective seatings of the bearing A and the arms embrace the rods F $F^1$, and for drawing the two clamps together an aperture is formed in each neck D for the reception of a bolt H, which passes between the two rods F $F^1$, the tightening of which causes the pairs of arms E E¹ to tighten upon the rods F F¹ and the jaws C C¹ to simultaneously tighten upon the seatings, the jaws C C¹ standing clear so as not to touch either of the rods F F¹, the construction and arrangement being such that the rods, if extended, pass clear on each side of the bearing. To insure an efficient grip one of the arms may be channeled and the other may present a flat surface, or both may be channeled. A suitable form of channel is of the angular type.

In cases where the force to be exerted by the jaws C C¹, is equal to that to be exerted by the arms E E¹ in embracing their respective parts, the aperture in the neck D would be located at equal distances from the positions of application, and in order to apportion the forces unequally the aperture in the neck D would be appropriately closer to the position of application to the arms E E¹ or the jaws C C¹ as would be necessary. In construction the jaws C C¹ of the clamps may be of annular formation, or, open jaws C C¹ as shown may be provided which permits the jaws to be applied transversely instead of necessitating their being passed over the end of the bearing or the end of a shaft K mounted in the bearing A.

In constructions according to this invention the bearing A may be segmentally divided if required or desired, to facilitate its application to contrivances.

I claim as my invention:

1. An appliance for supporting a bearing, in combination with a carrier, the appliance comprising two clamps having jaws for embracing spherical seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

2. An appliance for supporting a bearing, in combination with a carrier, the appliance comprising two clamps having jaws formed with concave bearing surfaces for embracing seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

3. An appliance for supporting a bearing, in combination with a carrier, the appliance comprising two clamps having jaws formed with concave bearing surfaces for embracing spherical seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

4. An appliance for supporting a bearing, in combination with a carrier, the appliance comprising two clamps having jaws embracing spherical seatings formed on the bearing and having parts for gripping the carrier, the carrier consisting of two rods arranged parallel to one another mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

5. An appliance for supporting a bearing, in combination with a carrier, the appliance comprising two clamps having jaws with concave bearing surfaces for embracing seatings formed on the bearing and having parts for gripping the carrier, the carrier consisting of two rods arranged parallel to one another mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

6. An appliance for supporting a bearing, in combination with a carrier, the appliance comprising two clamps having jaws formed with concave bearing surfaces for embracing spherical seatings formed on the bearing and having parts for gripping the carrier, the carrier consisting of two rods arranged parallel to one another mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

7. An appliance for supporting a bearing, in combination with a carrier, the appliance comprising two clamps having annular jaws for embracing spherical seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

8. An appliance for supporting a bearing, in combination with a carrier, the appliance comprising two clamps having annular jaws formed with concave bearing surfaces for embracing seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

9. An appliance for supporting a bearing, in combination with a carrier, the appliance comprising two clamps having annular jaws formed with concave bearing surfaces for embracing spherical seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

10. An appliance for supporting a bearing, in combination with a carrier, the appliance comprising two clamps having open jaws for embracing spherical seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

11. An appliance for supporting a bearing, in combination with a carrier, the appliance comprising two clamps having open jaws formed with concave bearing surfaces for embracing seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

12. An appliance for supporting a bearing, in combination with a carrier, the appliance comprising two clamps having open jaws formed with concave bearing surfaces for embracing spherical seatings formed on the bearing and having parts for gripping the carrier, the carrier being mounted capable of adjustment transversely to the axis of the bearing, and the clamps capable of adjustment along the carrier, in conjunction with means for causing the jaws to tightly embrace the seatings of the bearing and the parts to simultaneously tightly grip the carrier, for the purposes set forth.

13. An appliance for supporting a bearing, in combination with a carrier, the appliance comprising two clamps having jaws for embracing spherical seatings formed on the bearing and having arms for gripping the carrier, the carrier being mounted capable of adjustment transversely to the axis of the bearing, and the clamps capable of adjustment along the carrier, the jaws and arms extending from a neck in conjunction with a bolt passing through the two necks, for the purposes set forth.

14. An appliance for supporting a bearing, in combination with a carrier, the appliance comprising two clamps having jaws formed in concave bearing surfaces for embracing seatings formed on the bearing and having arms for gripping the carrier, the carrier being mounted capable of adjustment transversely to the axis of the bearing, and the clamps capable of adjustment along the carrier, the jaws and arms extending from a neck in conjunction with a bolt passing through the two necks, for the purposes set forth.

15. An appliance for supporting a bearing, in combination with a carrier, the appliance comprising two clamps having jaws formed with concave bearing surfaces for embracing spherical seatings formed on the bearing and having arms for gripping the carrier, the carrier being mounted capable of adjustment transversely to the axis of the bearing, and the clamps capable of adjustment along the carrier, the jaws and arms extending from a neck in conjunction with a bolt passing through the two necks, for the purposes set forth.

In testimony whereof I have signed my name to this specification in the presence of two subscribing witnesses.

THOMAS A. B. CARVER.

Witnesses:
J. ALOREA BREWER,
M. S. THORNTON.